United States Patent
Oel

(10) Patent No.: US 10,782,157 B2
(45) Date of Patent: Sep. 22, 2020

(54) ANALOG SIGNAL CONDITIONING WITH DIAGNOSTICS FOR CAPACITIVE SENSOR ELEMENTS

(71) Applicant: Faurecia Automotive Seating, LLC, Auburn Hills, MI (US)

(72) Inventor: Ludger Oel, Stadthagen (DE)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 166 days.

(21) Appl. No.: 16/018,194

(22) Filed: Jun. 26, 2018

(65) Prior Publication Data
US 2019/0390982 A1  Dec. 26, 2019

(51) Int. Cl.
G01D 5/24 (2006.01)
G01D 5/244 (2006.01)
B60N 2/00 (2006.01)
B60R 21/015 (2006.01)

(52) U.S. Cl.
CPC .............. *G01D 5/24* (2013.01); *B60N 2/002* (2013.01); *B60R 21/01532* (2014.10); *G01D 5/24452* (2013.01)

(58) Field of Classification Search
None
See application file for complete search history.

(56) References Cited

U.S. PATENT DOCUMENTS

| | | | |
|---|---|---|---|
| 4,765,184 A * | 8/1988 | Delatorre | E21B 47/06 327/362 |
| 5,691,639 A | 11/1997 | Demma | |
| 6,687,642 B2 | 2/2004 | Maher | |
| 6,994,674 B2 | 2/2006 | Sheljaskow | |
| 7,124,632 B2 | 10/2006 | Smith | |
| 8,573,842 B2 | 11/2013 | Shao | |
| 9,772,370 B2 | 9/2017 | Murashima | |
| 2015/0164387 A1 | 6/2015 | Varsavsky | |
| 2017/0060342 A1 | 3/2017 | Tang | |
| 2017/0363407 A1 * | 12/2017 | Sugita | H01L 21/67253 |
| 2019/0286261 A1 * | 9/2019 | Neel | G06F 3/0416 |

FOREIGN PATENT DOCUMENTS

| | | | | |
|---|---|---|---|---|
| JP | 2012168040 A | | 9/2012 | |
| JP | 2019027944 A | * | 2/2019 | ............. G01D 18/00 |

OTHER PUBLICATIONS

Replacing Discrete Protection Components with Overvoltage Fault Protected Switches, 2016, available from http://www.analog.com/en/analog-dialogue/articles/overvoltage-fault-protected-analog-switches.html, 14 pages.
Automotive Sensor Signal Conditioner with LIN and PWM Interface, May 30, 2016, available from https://www.mouser.com/ds/2/464/IDT_ZSSC3170_DST_20160530-962550.pdf, 31 pages.

* cited by examiner

*Primary Examiner* — Paresh Patel
(74) *Attorney, Agent, or Firm* — Barnes & Thornburg LLP

(57) ABSTRACT

A system includes multiple capacitive sensors, a multiplexer, a programmable gain amplifier, an oscillator, a switch, and a controller. The sensors are coupled to the multiplexer, the multiplexer is coupled to the switch, and the switch is coupled to the amplifier and the oscillator. The controller may control the multiplexer to select each of the sensors. The controller may control the switch to activate the amplifier or the oscillator. The controller may measure voltage output by the amplifier or frequency output by the oscillator. The system may be included in an occupant support such as a vehicle seat.

10 Claims, 3 Drawing Sheets

ANALOG SIGNAL CONDITIONING WITH DIAGNOSTICS FOR CAPACITIVE SENSOR ELEMENTS

BACKGROUND

The present disclosure relates to sensor systems for use with occupant supports. More particularly, the present disclosure relates to capacitive sensor systems.

SUMMARY

According to the present disclosure, a system to calibrate and provide a diagnostic output for a plurality of capacitive sensors includes a plurality of capacitive sensors, a multiplexer, a programmable gain amplifier (PGA), an oscillator, a switch, and a controller. The multiplexer includes a plurality of sensor inputs, a channel select input, and an output. Each sensor input is coupled to a capacitive sensor of the plurality of capacitive sensors. The PGA includes a sensor input, a gain input, and an output. The oscillator includes an input and an output. A frequency of the output depends on a capacitance coupled to the input. The switch includes a diagnostic select input, a sensor input coupled to the output of the multiplexer, a first output coupled to the sensor input of the PGA, and a second output coupled to the input of the oscillator. The controller includes an analog/digital input coupled to the output of the PGA, a gain control output coupled to the gain input of the PGA, a frequency input coupled to the input of the oscillator, a channel select output coupled to the channel select input of the multiplexer, and a diagnostic select output coupled to the diagnostic select input of the switch.

In illustrative embodiments, the plurality of capacitive sensors includes a piezoelectric sensor. In illustrative embodiments, the plurality of capacitive sensors is coupled to a vehicle seat.

In illustrative embodiments, the controller is configured to output a channel select signal to the multiplexer to select a first capacitive sensor of the plurality of capacitive sensors, output a first diagnostic select signal to the switch to activate the first output, read a voltage value with the analog/digital input in response to output of the first diagnostic select signal and output of the channel select signal, output a second diagnostic select signal to the switch to activate the second output, and read a frequency value with the frequency input in response to output of the second diagnostic select signal and output of the channel select signal.

In illustrative embodiments, the controller may be further configured to compare the frequency value to a predetermined reference frequency associated with the first capacitive sensor. The controller may be further configured to determine a status of the first capacitive sensor in response to comparison of the frequency value to the predetermined reference frequency. The controller may be further configured to output a gain control signal to the PGA in response to the output of the first diagnostic select signal and the output of the channel select signal. The gain control signal is associated with the first capacitive sensor.

In illustrative embodiments, the controller may be further configured to output a second channel select signal to the multiplexer to select a second capacitive sensor of the plurality of capacitive sensors, read a second voltage value with the analog/digital input in response to output of the first diagnostic select signal and output of the second channel select signal, and read a second frequency value with the frequency input in response to output of the second diagnostic select signal and output of the second channel select signal. The controller may be further configured to output a second gain control signal to the PGA in response to the output of the first diagnostic select signal and the output of the second channel select signal. The second gain control signal is associated with the second capacitive sensor.

In illustrative embodiments, the voltage data is indicative of biomedical data sensed by the first capacitive sensor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
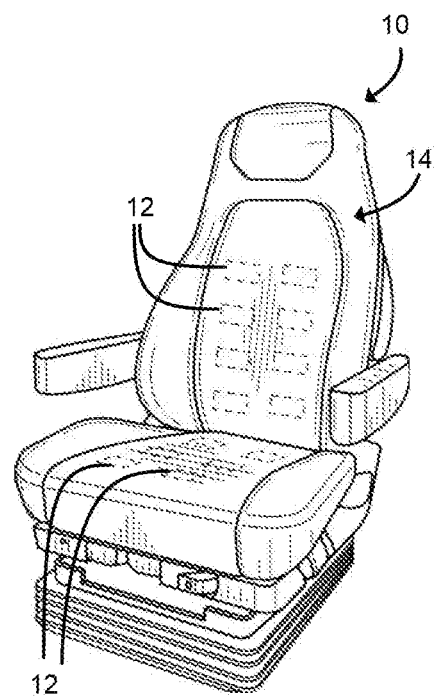
FIG. 1 is a perspective and diagrammatic view of a sensor system in accordance with the present disclosure coupled to an occupant support suggesting that the sensor system includes a plurality of sensors configured to measure physiological data of an occupant positioned on the occupant support and a control system coupled to the sensors.
Figure 2:
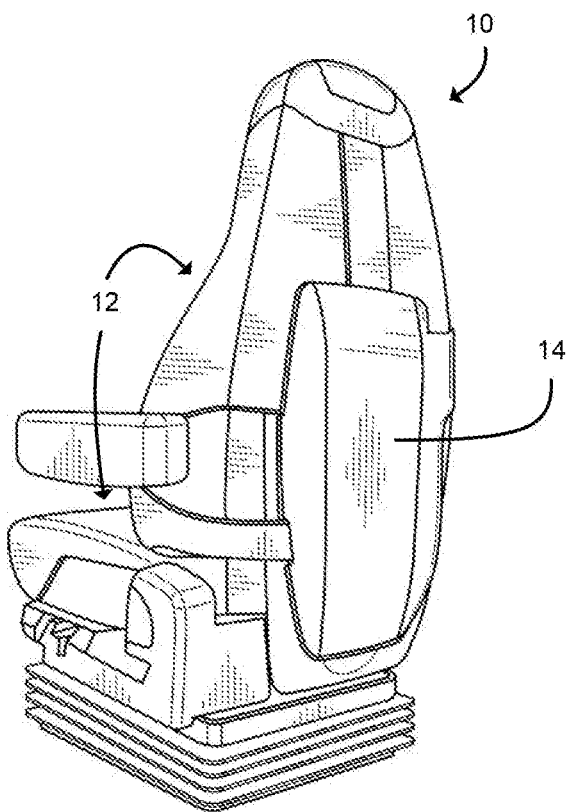
FIG. 2 is a rear perspective view of the sensor system in coupled to the occupant support showing the control system housed in a back of the occupant support.

A sensor system 14 in accordance with the present disclosure is adapted for use with an occupant support 10 such as, for example, a seat as shown in FIGS. 1 and 2. Occupant support 10 may be included in a vehicle or occupant support 10 may be any occupant support 10 configured to support an occupant.

As shown in FIGS. 1 and 2, the occupant support 10 includes a plurality of sensors 12 which may be configured to measure occupant physiology and surrounding environment information. The sensors 12 may be incorporated in or otherwise attached to one or more comfort layers of the occupant support 10 or otherwise incorporated in the occupant support 10. sensor system 14 receives signals from the sensors 12. The sensor system 14 may determine occupant health data indicative of physiological characteristics of an occupant and/or occupant state data indicative of a state of the occupant based on signals from the sensors 12. The sensor system 14 may also determine sensor status data based on signals from the sensors 12.

Each of the sensors 12 is embodied as a capacitive sensor such as a piezoelectric sensor, an electrode, or another electrical sensor with a specific electrical capacitance. The sensors 12 may be used to measure biomedical data, for example by measuring heart rate or respiration rate using one or more piezoelectric sensors 12. Illustratively, the sensors 12 are spaced apart from each other and located in a bottom cover and a back cover of the occupant support 10. Additionally, the occupant support 10 may include a different number and/or arrangement of sensors 12.

The sensor system 14 is configured to receive signals from the sensors 12, including measuring occupant physiology and surrounding environment information as well as receiving sensor diagnostic information. As shown in FIG.

3, the control system includes a multiplexer 16, a switch 18, a programmable gain amplifier (PGA) 20, an oscillator 22, and a controller 24. The controller 24 may be embodied as any microcontroller, microprocessor, system-on-a-chip (SoC), electronic control unit (ECU), digital signal processor, or other control circuit capable of performing the operations described herein. As shown, the controller 24 includes an analog/digital input 26, a gain control output 28, a timer input 30, a diagnostic select output 32, and a channel select output 34. Each of the inputs and outputs of the controller 24 may be embodied as one or more dedicated pins, signals, general purpose I/O (GPIO) pins, buses, circuit traces, or other connections between the controller 24 and other components of the sensor system 14.

Figure 3:
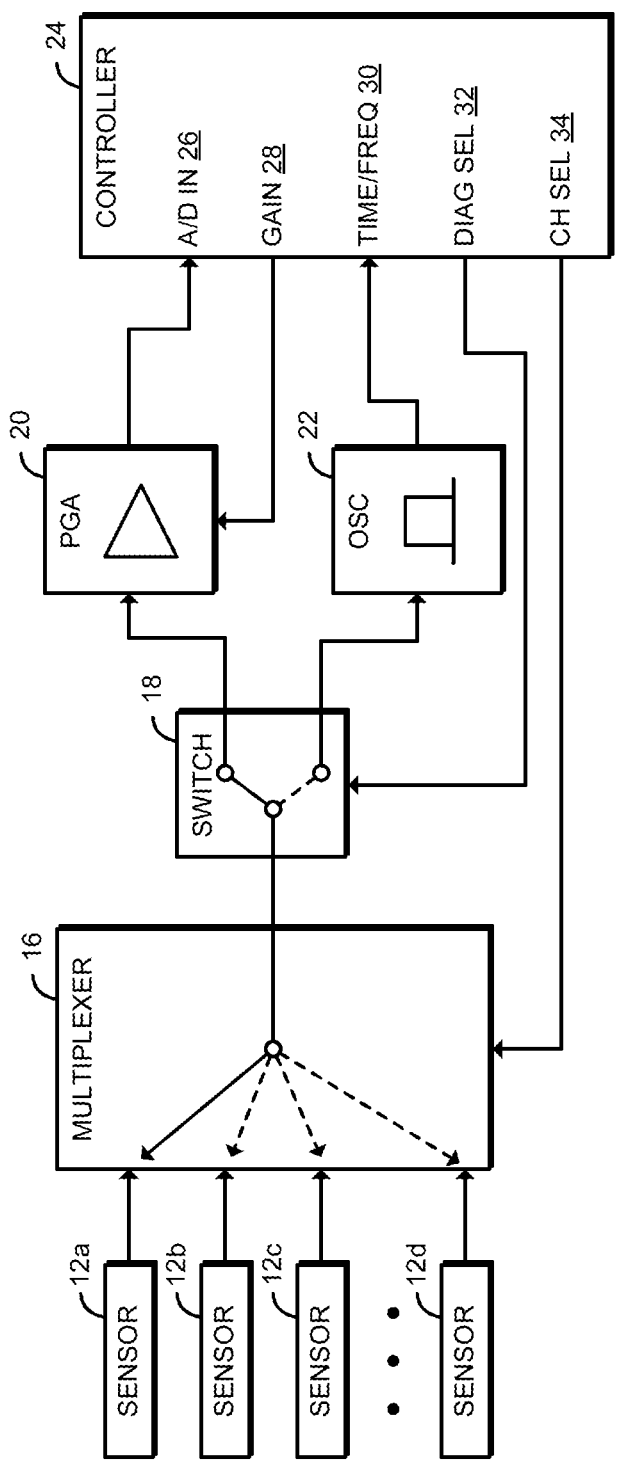
FIG. 3 is a diagrammatic view of the sensor system of FIGS. 1 and 2.

The channel select output 34 of the controller 24 is connected to an input select of the multiplexer 16. The multiplexer 16 may be embodied as an analog multiplexer with multiple inputs and a single output. Each input of the multiplexer 16 is connected to a sensor 12. The output of the multiplexer 16 is connected to an input of the switch 18. Thus, the channel select output 34 may be used to select a particular sensor 12. Illustratively, as shown in FIG. 3, sensor 12a is selected, and thus the sensor 12a is connected to the switch 18 via the multiplexer 16. Additionally, although illustrated as including a single multiplexer, it should be understood that in some embodiments the sensor system 14 may include multiple multiplexers 16 that may be used in combination to select a particular sensor 12.

The switch 18 may be embodied as a transistor, a relay, or any other electrically operable switch. The switch 18 has a single input connected to the multiplexer 16 and two outputs that are connected to the PGA 20 and the oscillator 22, respectively. The diagnostic select output 32 of the controller 24 is connected to an input select of the switch 18. Illustratively, as shown in FIG. 3, the PGA 20 is selected, and thus the sensor 12 selected by the multiplexer 16 is connected to the PGA 20. Similarly, when the oscillator 22 is selected, the sensor 12 selected by the multiplexer 16 is connected to the oscillator 22.

The PGA 20 may be embodied as any programmable gain amplifier. The PGA 20 is configured as a voltage mode amplifier. The input of the PGA 20 is connected to the switch 18, and the output of the PGA 20 is connected to a voltage measurement device, illustratively the A/D input 26 of the controller 24. The PGA 20 also includes a gain control input that is connected to the gain control output 28 of the controller 24. As described below, the controller 24 may set the gain of the PGA 20 based on the selected sensor 12.

The oscillator 22 may be embodied as any oscillator circuit with an output frequency that depends on input capacitance. The input of the oscillator 22 is connected to the switch 18. Thus, the output frequency of the oscillator 22 depends on the capacitance of the sensor 12 selected by the multiplexer 16 and connected via the switch 18. The output of the oscillator 22 is connected to a time/frequency measurement device, illustratively the timer input 30 of the controller 24.

Figure 4:
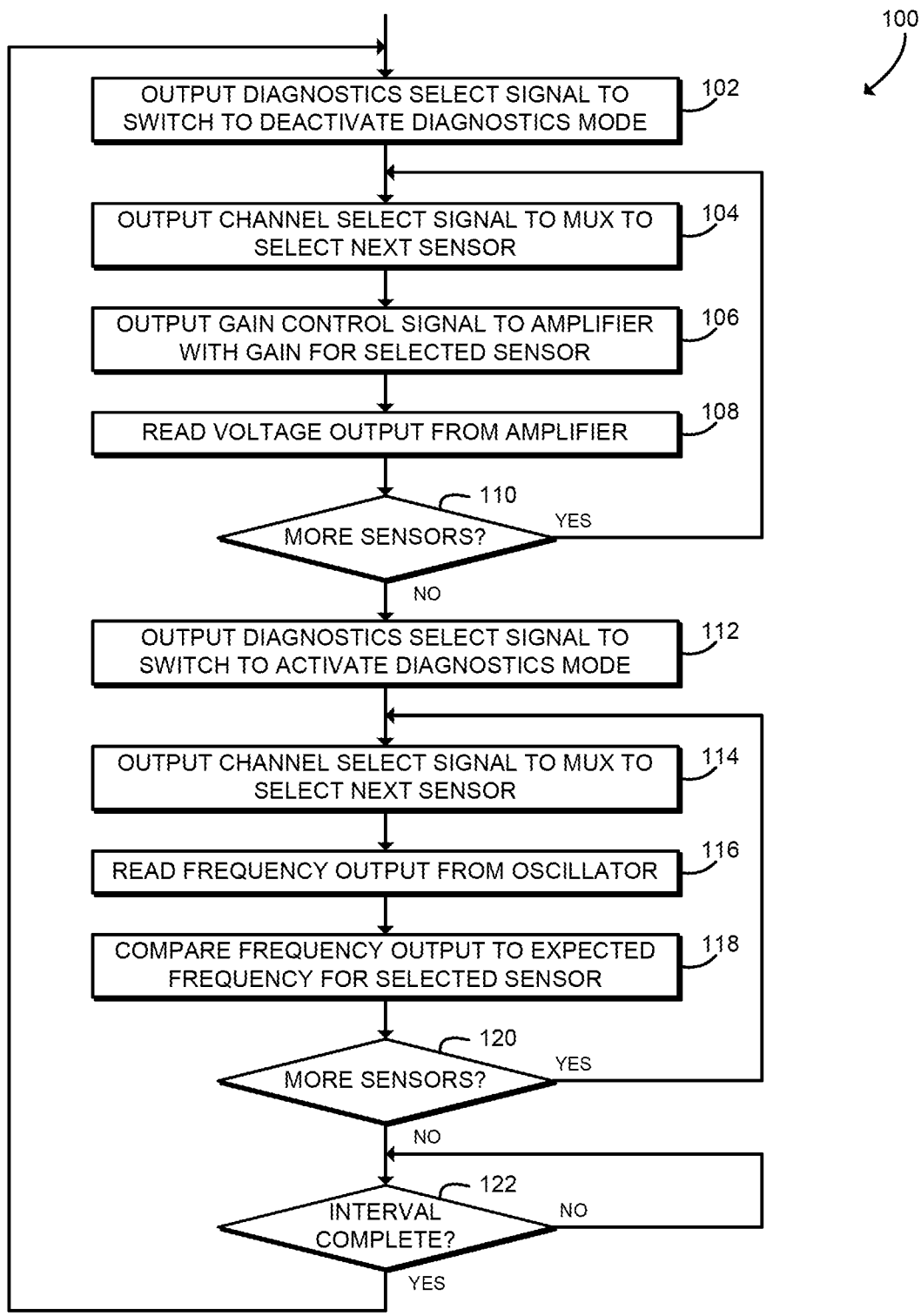
FIG. 4 is a simplified flow diagram illustrating a method for sensor sampling and diagnostics that may be executed by the sensor system of FIGS. 1-3.

In use, the controller 24 may execute a method 100 as shown in FIG. 4 for measuring sensor data and diagnostics data for the sensors 12. For example, the method 100 may be embodied as various instructions stored on a computer-readable media, which may be executed by the controller 24 to cause the controller 24 to perform the method 100. The computer-readable media may be embodied as any type of media capable of being read by the controller 24 including, but not limited to, a memory, a data storage device, firmware devices, microcode, other memory or data storage devices.

The method 100 beings in block 102, in which the controller 24 outputs a diagnostics select signal 32 to the switch 18 to cause the switch 18 to deactivate a diagnostics mode. When the diagnostics mode is deactivated, the output of the switch 18 coupled to PGA 20 is activated and the output of the switch 18 coupled to the oscillator 22 is deactivated. Thus, in the deactivated mode, the PGA 20 is connected to the multiplexer 16 via the switch 18. The diagnostics select signal 32 may be embodied as any appropriate digital signal or signals and/or analog signal or signals that causes the switch 18 to deactivate the diagnostics mode.

In block 104, the controller 24 outputs a channel select signal 34 to the multiplexer 16 to cause the multiplexer 16 to select a next sensor 12. For example, referring again to FIG. 2, the channel select signal 34 may cause the multiplexer to select the sensor 12a and, as described further below, the controller 24 may iteratively select the remaining sensors 12b, 12c, 12d. The selected sensor 12 is thus connected to the PGA 20 via the multiplexer 16 and the switch 18. The channel select signal 34 may be embodied as any appropriate digital or signals and/or analog signal or signals that causes the multiplexer 16 to select a particular sensor 12.

In block 106, the controller 24 outputs a gain control signal 28 to the PGA 20 based on the selected sensor 12. The PGA 20 amplifies signal received from the sensor 12 via the multiplexer 16 and the switch 18 according to the gain control signal 28. The PGA 20 illustratively operates as a voltage mode amplifier. Thus, the same PGA 20 may operate as an analog signal conditioning stage for multiple sensors 12. Accordingly, the sensor system 14 may reduce system complexity by eliminating tolerances associated with multiple signal conditioning stages and eliminating calibration required for multiple signal conditioning stages. The sensor system 14 may also reduce board space required on an electronic printed circuit board or otherwise reduce costs associated with multiple signal conditioning stages.

In block 108, the controller 24 reads the voltage output from the PGA 20. For example, the controller 24 may read a voltage value with the A/D input 26. The voltage value is indicative of sensor data generated by the selected sensor 12, which may include physiological or biomedical data. For example, the sensor data may be indicative of heart rate or respiration rate of an occupant of the occupant support 10. The controller 24 may determine occupant health data and/or occupant state data based on the signals received from the sensors 12. Additionally or alternatively, the sensor data may be provided to another electronic control unit, computer, smart device, cloud computing system, or other data system for processing.

In block 110, the controller 24 determines whether additional sensors 12 remain for sampling. For example, the controller 24 may iterate through all of the sensors 12 coupled to the occupant support 10 and sample the voltage output by each sensor 12. If one or more additional sensors 12 remain, the method 100 loops back to block 104 to select the next sensor 12 and read the associated voltage output. If no more sensors 12 remain for sampling, the method 100 advances to block 112.

In block 112, the controller 24 outputs a diagnostics select signal 32 to the switch 18 to cause the switch 18 to activate the diagnostics mode. When the diagnostics mode is activated, the output of the switch 18 coupled to PGA 20 is deactivated and the output of the switch 18 coupled to the oscillator 22 is activated. Thus, in the deactivated mode, the oscillator 22 is connected to the multiplexer 16 via the switch 18. The diagnostics select signal 32 may be embodied as any appropriate digital signal or signals and/or analog signal or signals that causes the switch 18 to activate the diagnostics mode.

In block 114, the controller 24 outputs a channel select signal 34 to the multiplexer 16 to cause the multiplexer 16 to select a next sensor 12. For example, referring again to FIG. 2, the channel select signal 34 may cause the multiplexer to select the sensor 12*a* and, as described further below, the controller 24 may iteratively select the remaining sensors 12*b*, 12*c*, 12*d*. The selected sensor 12 is thus connected to the oscillator 22 via the multiplexer 16 and the switch 18. The channel select signal 34 may be embodied as any appropriate digital or signals and/or analog signal or signals that causes the multiplexer 16 to select a particular sensor 12.

In block 116, the controller 24 reads a frequency output from the oscillator 22. For example, the controller 24 may read the frequency with the timer input 30. As described above, the frequency output by the oscillator 22 depends on the capacitance of the selected sensor 12.

In block 118, the controller 24 compares the frequency output from the oscillator 22 to an expected frequency for the selected sensor 12. Each sensor 12 has a normal or otherwise excepted capacitance. Broken wires, damaged sensing elements, or other off-nominal conditions of the sensor 12 may cause the capacitance of the sensor 12 to change. Therefore, the frequency output from the oscillator 22 differing from the expected frequency may indicate the status of a particular sensor 12 (e.g., that the particular sensor 12 may be damaged or inoperable). Thus, similar to reducing the number of signal conditioning stages, the sensor system 14 may provide diagnostic features for multiple sensors 12 using a common component. Accordingly, the sensor system 14 may reduce complexity and/or cost of sensor 12 diagnostics.

In block 120, the controller 24 determines whether additional sensors 12 remain for diagnostics. For example, the controller 24 may iterate through all of the sensors 12 coupled to the occupant support 10 and determine the status of each individual sensor 12. If one or more additional sensors 12 remain, the method 100 loops back to block 114 to select the next sensor 12 and read the associated frequency. If no more sensors 12 remain for diagnostics, the method 100 advances to block 122.

In block 122, the controller 24 determines whether a fixed time interval has elapsed. For example, the time interval may be one millisecond (ms) or another predetermined time interval. In some embodiments, reading voltage for all of the sensors 12 as described above in connection with blocks 102-110 may be completed in a short amount of time, for example on the order of microseconds (μs). In some embodiments, the remaining time of each interval may be spent performing diagnostics as described above in connection with blocks 114-120. If the fixed time interval has not elapsed, the method 100 loops back to block 122 to continue waiting for the fixed time interval to elapse. If the fixed time interval has elapsed, the method 100 loops back to block 102 to continue sampling the sensors 12 and performing diagnostics.

In another example, the controller 24 may execute a method for measuring sensor data and diagnostics data for the sensors 12. For example, the method may read all sensor data as fast as possible and then use the remaining time within the task to perform diagnostics on each sensor. In another example, the method may read a sensor value, switch to the diagnostic mode, read frequency, and then select the next sensor and perform the same set of actions. However, any suitable combination of actions may be used.

The following numbered clauses include embodiments that are contemplated and non-limiting:

Clause 1. A system to calibrate and provide a diagnostic output for a plurality of capacitive sensors, the system comprising
a plurality of capacitive sensors;
a multiplexer including a plurality of sensor inputs, a channel select input, and an output, wherein each sensor input is coupled to a capacitive sensor of the plurality of capacitive sensors.

Clause 2. The system of clause 1, any other clause, or combination of clauses, further comprising a programmable gain amplifier (PGA) including a sensor input, a gain input, and an output.

Clause 3. The system of clause 2, any other clause, or combination of clauses, further comprising an oscillator including an input and an output, wherein a frequency of the output depends on a capacitance coupled to the input.

Clause 4. The system of clause 3, any other clause, or combination of clauses, further comprising a switch including a diagnostic select input, a sensor input coupled to the output of the multiplexer, a first output coupled to the sensor input of the PGA, and a second output coupled to the input of the oscillator.

Clause 5. The system of clause 4, any other clause, or combination of clauses, further comprising a controller including an analog/digital input coupled to the output of the PGA, a gain control output coupled to the gain input of the PGA, a frequency input coupled to the input of the oscillator, a channel select output coupled to the channel select input of the multiplexer, and a diagnostic select output coupled to the diagnostic select input of the switch.

Clause 6. The system of claim 5, any other clause, or combination of clauses, wherein the plurality of capacitive sensors comprises a piezoelectric sensor.

Clause 7. The system of claim 6, any other clause, or combination of clauses, wherein the plurality of capacitive sensors is coupled to a vehicle seat.

Clause 8. The system of claim 5, any other clause, or combination of clauses, wherein the controller is configured to:
output a channel select signal to the multiplexer to select a first capacitive sensor of the plurality of capacitive sensors;
output a first diagnostic select signal to the switch to activate the first output;
read a voltage value with the analog/digital input in response to output of the first diagnostic select signal and output of the channel select signal;
output a second diagnostic select signal to the switch to activate the second output; and
read a frequency value with the frequency input in response to output of the second diagnostic select signal and output of the channel select signal.

Clause 9. The system of claim 8, any other clause, or combination of clauses, wherein the controller is further configured to compare the frequency value to a predetermined reference frequency associated with the first capacitive sensor.

Clause 10. The system of claim 9, any other clause, or combination of clauses, wherein the controller is further configured to determine a status of the first capacitive sensor in response to comparison of the frequency value to the predetermined reference frequency.

Clause 11. The system of claim 8, any other clause, or combination of clauses, wherein the controller is further configured to output a gain control signal to the PGA in response to the output of the first diagnostic select signal and the output of the channel select signal, wherein the gain control signal is associated with the first capacitive sensor.

Clause 12. The system of claim 8, any other clause, or combination of clauses, wherein the controller is further configured to:

output a second channel select signal to the multiplexer to select a second capacitive sensor of the plurality of capacitive sensors;

read a second voltage value with the analog/digital input in response to output of the first diagnostic select signal and output of the second channel select signal; and read a second frequency value with the frequency input in response to output of the second diagnostic select signal and output of the second channel select signal.

Clause 13. The system of claim 12, any other clause, or combination of clauses, wherein the controller is further configured to output a second gain control signal to the PGA in response to the output of the first diagnostic select signal and the output of the second channel select signal, wherein the second gain control signal is associated with the second capacitive sensor.

Clause 14. The system of claim 8, any other clause, or combination of clauses, wherein the voltage data is indicative of biomedical data sensed by the first capacitive sensor.

The invention claimed is:

1. A system to calibrate and provide a diagnostic output for a plurality of capacitive sensors, the system comprising:
    a plurality of capacitive sensors;
    a multiplexer including a plurality of sensor inputs, a channel select input, and an output, wherein each sensor input is coupled to a capacitive sensor of the plurality of capacitive sensors;
    a programmable gain amplifier (PGA) including a sensor input, a gain input, and an output;
    an oscillator including an input and an output, wherein a frequency of the output depends on a capacitance coupled to the input;
    a switch including a diagnostic select input, a sensor input coupled to the output of the multiplexer, a first output coupled to the sensor input of the PGA, and a second output coupled to the input of the oscillator; and
    a controller including an analog/digital input coupled to the output of the PGA, a gain control output coupled to the gain input of the PGA, a frequency input coupled to the input of the oscillator, a channel select output coupled to the channel select input of the multiplexer, and a diagnostic select output coupled to the diagnostic select input of the switch.

2. The system of claim 1, wherein the plurality of capacitive sensors comprises a piezoelectric sensor.

3. The system of claim 2, wherein the plurality of capacitive sensors is coupled to a vehicle seat.

4. The system of claim 1 wherein the controller is configured to:
    output a channel select signal to the multiplexer to select a first capacitive sensor of the plurality of capacitive sensors;
    output a first diagnostic select signal to the switch to activate the first output;
    read a voltage value with the analog/digital input in response to output of the first diagnostic select signal and output of the channel select signal;
    output a second diagnostic select signal to the switch to activate the second output; and
    read a frequency value with the frequency input in response to output of the second diagnostic select signal and output of the channel select signal.

5. The system of claim 4, wherein the controller is further configured to compare the frequency value to a predetermined reference frequency associated with the first capacitive sensor.

6. The system of claim 5, wherein the controller is further configured to determine a status of the first capacitive sensor in response to comparison of the frequency value to the predetermined reference frequency.

7. The system of claim 4, wherein the controller is further configured to output a gain control signal to the PGA in response to the output of the first diagnostic select signal and the output of the channel select signal, wherein the gain control signal is associated with the first capacitive sensor.

8. The system of claim 4, wherein the controller is further configured to:
    output a second channel select signal to the multiplexer to select a second capacitive sensor of the plurality of capacitive sensors;
    read a second voltage value with the analog/digital input in response to output of the first diagnostic select signal and output of the second channel select signal; and
    read a second frequency value with the frequency input in response to output of the second diagnostic select signal and output of the second channel select signal.

9. The system of claim 8, wherein the controller is further configured to output a second gain control signal to the PGA in response to the output of the first diagnostic select signal and the output of the second channel select signal, wherein the second gain control signal is associated with the second capacitive sensor.

10. The system of claim 4, wherein the voltage data is indicative of biomedical data sensed by the first capacitive sensor.

* * * * *